(12) United States Patent
Tom et al.

(10) Patent No.: US 9,692,611 B1
(45) Date of Patent: Jun. 27, 2017

(54) CONTEXT-BASED SENSOR SELECTION

(75) Inventors: Kevin Tom, San Francisco, CA (US);
Amy Han, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 454 days.

(21) Appl. No.: 13/081,216

(22) Filed: Apr. 6, 2011

(51) Int. Cl.
*G01L 15/00* (2006.01)
*H04L 12/26* (2006.01)

(52) U.S. Cl.
CPC ................ *H04L 12/2697* (2013.01)

(58) Field of Classification Search
CPC .............. H04L 12/2697; G06F 3/00
USPC ........................................ 702/121
See application file for complete search history.

(56) References Cited

U.S. PATENT DOCUMENTS

| | | | | |
|---|---|---|---|---|
| 5,801,970 | A * | 9/1998 | Rowland et al. | 703/6 |
| 6,917,850 | B2 * | 7/2005 | Kamishio | 700/180 |
| 7,203,517 | B2 | 4/2007 | Shimoda et al. | |
| 7,479,943 | B1 | 1/2009 | Lunsford et al. | |
| 7,793,316 | B2 | 9/2010 | Mears et al. | |
| 7,940,206 | B2 * | 5/2011 | Nohara et al. | 342/59 |
| 8,862,715 | B1 * | 10/2014 | Tom et al. | 709/223 |
| 2004/0100923 | A1 | 5/2004 | Yam et al. | |
| 2004/0157624 | A1 | 8/2004 | Hrastar | |
| 2004/0254767 | A1 * | 12/2004 | Merkin et al. | 702/188 |
| 2006/0175753 | A1 * | 8/2006 | MacIver et al. | 273/237 |
| 2008/0125103 | A1 | 5/2008 | Mock | |
| 2008/0125163 | A1 | 5/2008 | Chi et al. | |
| 2009/0006522 | A1 | 1/2009 | Kim et al. | |
| 2009/0327478 | A1 | 12/2009 | Krause et al. | |
| 2010/0081406 | A1 | 4/2010 | Tan et al. | |
| 2010/0098055 | A1 * | 4/2010 | Kutt et al. | 370/352 |
| 2010/0145479 | A1 * | 6/2010 | Griffiths | 700/17 |
| 2010/0199197 | A1 | 8/2010 | Faletski et al. | |
| 2010/0233961 | A1 * | 9/2010 | Holden | G06F 13/385 455/41.3 |
| 2010/0255856 | A1 * | 10/2010 | Kansal et al. | 455/456.1 |
| 2010/0332043 | A1 * | 12/2010 | Weyland | G06F 1/3296 700/291 |
| 2011/0086638 | A1 | 4/2011 | Medapalli et al. | |
| 2011/0131506 | A1 | 6/2011 | Calissendorff | |
| 2011/0215966 | A1 | 9/2011 | Kim et al. | |
| 2015/0201377 | A1 | 7/2015 | Harrison et al. | |

OTHER PUBLICATIONS

Final Office Action for U.S. Appl. No. 13/246,792, mailed Jun. 28, 2012, 15 pages.
Non-Final Office Action for U.S. Appl. No. 13/246,792, mailed Feb. 1, 2012, 12 pages.

* cited by examiner

*Primary Examiner* — Michael Nghiem
(74) *Attorney, Agent, or Firm* — Brake Hughes Bellermann LLP

(57) ABSTRACT

Pending execution of a sensor function for use in operation of an application executing on a computing device may be determined. At least a first sensor and a second sensor associated with the computing device may be identified, the first sensor and the second sensor both providing at least a portion of the sensor function. A current context associated with the pending execution of the sensor function may be determined, the current context being defined in terms of context parameters. Selection criteria defined in terms of the context parameters may be accessed, and the first sensor may be selected to execute the sensor function for the application, based on the selection criteria and the current context.

18 Claims, 5 Drawing Sheets

CONTEXT-BASED SENSOR SELECTION

TECHNICAL FIELD

This description relates to the use of sensors by software applications.

BACKGROUND

Computing devices, and, in particular, applications executing on computing devices, often rely on sensors to collect information that is external to the computing device and that is required by the applications to execute one or more functions of the applications. For example, an application executing on a mobile computing device may function to provide a user of the mobile computing device with recommendations for nearby restaurants. In such examples, a GPS sensor or other location sensor of the mobile computing device may collect location data to be used by the application in providing the recommendation. Of course, many other types of sensors may be used to provide corresponding sensor data to a requesting application. For example, sensors may be used to collect sensor data related to various physical phenomena, such as, for example, temperature, light, sound, or vibration. In other examples, sensors may be used to conduct network communications (e.g., wired or wireless modems or other network access devices).

Thus, in practice, applications are typically constructed and configured to interface or otherwise interact with a desired/specified sensor. For example, in the example given above, the application of the mobile computing device may be configured to interact with a location sensor to obtain the desired location data. In many situations, however, it may occur that the sensor in question provides corresponding sensor data in a suboptimal fashion. For example, it may occur that the location sensor in question provides location data that fails to meet, or that needlessly exceeds, the actual requirements of the user of the corresponding application. Consequently, it may occur that the user is not provided with sufficiently accurate information, or that battery power of the computing device is needlessly wasted. In other words, resources of the computing device, and thus, of the user, may fail to be deployed in an optimal manner.

SUMMARY

According to one general aspect, a computer system may include instructions stored on a non-transitory computer-readable storage medium and readable by at least one processor. The computer system may include an input handler configured to cause the at least one processor to determine a pending execution of a sensor function for use in operation of an application executing on a computing device, and to identify at least a first sensor and a second sensor associated with the computing device, the first sensor and the second sensor both providing at least a portion of the sensor function. The computer system may include a context monitor configured to cause the at least one processor to determine a current context associated with the pending execution of the sensor function, the current context being defined in terms of context parameters. The computer system may include a sensor selector configured to cause the at least one processor to access selection criteria defined in terms of the context parameters, and to select the first sensor to execute the sensor function for the application, based on the selection criteria and the current context.

According to another general aspect, a computer-implemented method may include executing instructions stored on a computer-readable medium. The method may include determining a pending execution of a sensor function for use in operation of an application executing on a computing device, and identifying at least a first sensor and a second sensor associated with the computing device, the first sensor and the second sensor both providing at least a portion of the sensor function. The method may include determining a current context associated with the pending execution of the sensor function, the current context being defined in terms of context parameters. The method may include accessing selection criteria defined in terms of the context parameters, and selecting the first sensor to execute the sensor function for the application, based on the selection criteria and the current context.

According to another general aspect, a computer program product may be tangibly embodied on a computer-readable medium, and may include executable code that, when executed, may be configured to cause a data processing apparatus to determine pending execution of a sensor function for use in operation of an application executing on a computing device. The executable code, when executed, may be configured to cause the data processing apparatus to identify at least a first sensor and a second sensor associated with the computing device, the first sensor and the second sensor both providing at least a portion of the sensor function, and determine a current context associated with the pending execution of the sensor function, the current context being defined in terms of context parameters. The executable code, when executed, may be configured to cause the data processing apparatus to access selection criteria defined in terms of the context parameters, and select the first sensor to execute the sensor function for the application, based on the selection criteria and the current context.

The details of one or more implementations are set forth in the accompanying drawings and the description below. Other features will be apparent from the description and drawings, and from the claims.

DETAILED DESCRIPTION

Figure 1:
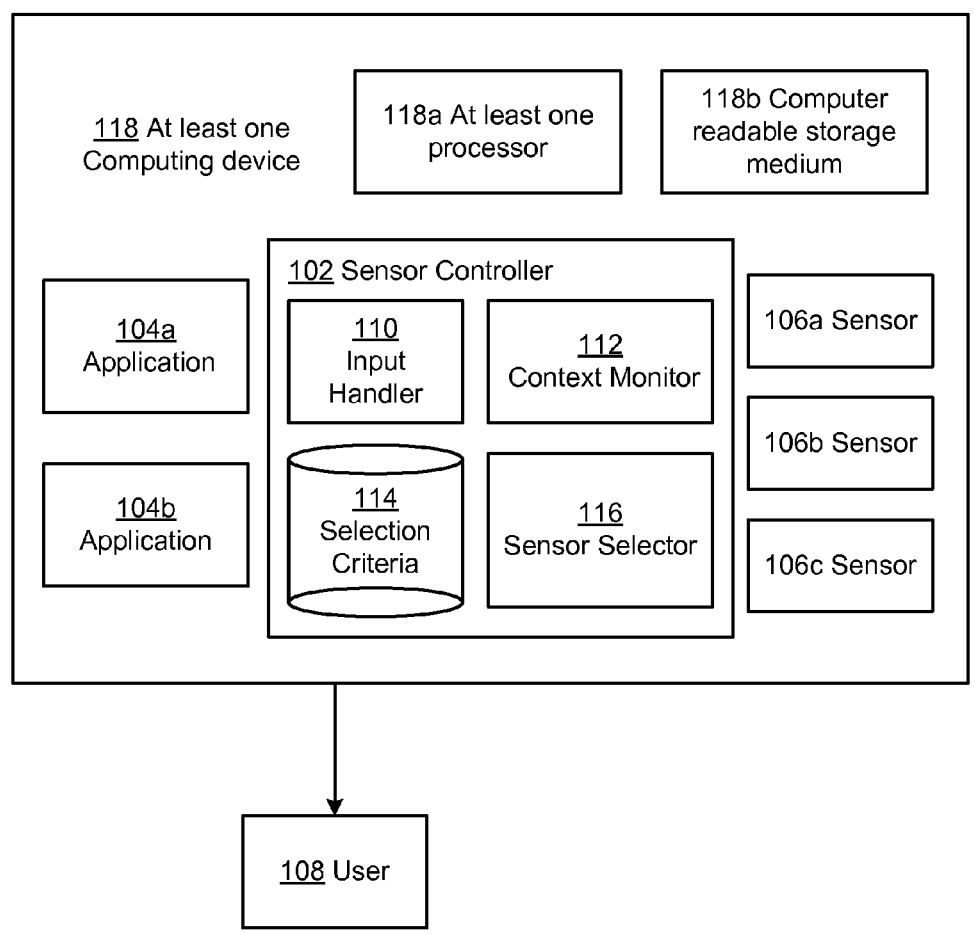
FIG. 1 is a block diagram of a system for providing context-specific sensor selection.

FIG. 1 is a block diagram of a system 100 for providing context-specific sensor selection. In the example of FIG. 1, sensor selection may occur in real time in order to provide a desired sensor functionality in a flexible and dynamic manner. In this way, an overall operation of the system 100 may be adjusted or otherwise optimized to achieve a desired result.

In the system 100, a sensor controller 102 may be configured to communicate with one or more computer applications, illustrated in the example of FIG. 1 as applications 104A, 104B. Further in the example of FIG. 1, the sensor controller 102 may be configured to communicate with a plurality of sensors, illustrated in the example of FIG. 1 as sensors 106A, 106B, 106C. During operation, a user 108 may execute one or both of the applications 104A, 104B, and, in so doing, may require certain sensor functionalities and/or associated collected sensor data, in order to complete the execution of one or more particular operations of the application 104A and/or 104B.

In such scenarios, it may occur that two or more of the sensors 106A, 106B, 106C may be configured to provide the same, similar, or overlapping sensor functionalities. Therefore, during operation, the sensor controller 102 may be configured to configure, operate, or otherwise select one or more sensors from the available sensors 106A, 106B, 106C to thereby provide the desired sensor functionality and/or associated sensor data to one or both of the applications 104A, 104B, as needed. As described in detail herein, the sensor controller 102 may execute such sensor selections in real time, during a runtime of one or both of the applications 104A, 104B.

More generally, the sensor controller 102 may make such sensor selections based on a current context which exists within, or is associated with, the system 100, at a time of the selection. In this way, the sensor controller 102 may be operable to adjust, configure, or otherwise optimize a use and operation of the sensors 106A, 106B, 106C, relative to specified parameters, such as, e.g., available computing resources and/or preferences of the user 108. Consequently, an experience of the user 108 may be improved and enhanced.

In a specific example, the application 104A may include functionality for recommending a restaurant or other service or location to the user 108. Meanwhile, the sensor 106A may represent a global positioning system (GPS) sensor, while the sensor 106B may represent hardware and/or software associated with communicating with a Wi-Fi network to determine location information. In the example, it may occur that the GPS sensor 106A is more accurate than the Wi-Fi based location sensor 106B, while the Wi-Fi based location sensor 106B may use less power than the GPS sensor 106A.

In some instances of execution of the application 104A, the user 108 may have a requirement for a highest-available degree of accuracy in determining a desired location. However, in other instances of the application 104A, the user 108 may not require the same level of accuracy. Consequently, during operation of the system 100, the sensor controller 102 may communicate with the application 104A and may otherwise determine the context related to a current instance thereof, to thereby select between the sensors 106A, 106B to receive the necessary location information. As just referenced, the selection may be driven by, e.g., requirements of the application 104A and/or the user 108, by a current availability of computing resources, or by various other criteria related to a current context of the system 100 at the time of the execution of the particular instance of the application 104A.

In more specific examples, as shown, the sensor controller 102 may include an input handler 110. The input handler 110 may be configured to communicate, interact, or otherwise interface with the applications 104A, 104B, as well as with the user 108, as described in more detail below.

For example, the input handler 110 may include one or more application program interfaces (APIs) for communicating with the applications 104A, 104B. Meanwhile, the input handler 110 may be associated with a graphical user interface (GUI), or other user interface element, in order to receive input from the user 108 which may be related to a current or future selection between some or all of the sensors 106A, 106B, 106C.

Further in the specific example of FIG. 1, a context monitor 112 may be configured to collect information related to a context of, e.g., the user 108, the applications 104A, 104B, hardware/software resources of, or associated with, the system 100, or virtually any contextual information related to the system 100 which may be relevant to executing a selection between some or all of the sensors 106A, 106B, 106C. Many examples of such contextual information are provided herein, or would be apparent to one of skill in the art.

To give a few, non-limiting examples, the context monitor 112 may be configured to monitor current power (e.g., battery) resources associated with the system 100. In other examples, the context monitor 112 may determine, to varying levels of accuracy, a current location of the user 108. In some example embodiments, the context monitor 112 may be operable to proactively determine or detect currently-existing context information regarding the applications 104A, 104B, the user 108, or any such currently-existing information related to the system 100. In additional or alternative examples, the context monitor 112 may be configured to passively collect such context information over a period of time, so that such historical contextual information may be analyzed or otherwise accessed to determine patterns of the user 108 or otherwise correlate the historical contextual information with a current context used by the sensor controller 102 in executing selection criteria 114 to thereby select between the available sensors 106A, 106B, 106C.

That is, as shown, the sensor controller 102 may further include selection criteria 114 which represent stored methods and data to be used in algorithmically defining a decision making process for selecting between the sensors 106A, 106B, 106C. In other words, the selection criteria 114 may be used to define a manner in which the collected context information is to be used in executing sensor selection. For example, the selection criteria 114 may include static criteria associated with making a sensor selection. For example, the user 108 may define the selection criteria 114 as including a requirement that sensor selection always maximizes conservation of available power of the system 100. More generally, the selection criteria 114 may specify virtually any rule(s) or algorithm(s) defined by a designer of the system 100 and/or the user 108 for executing the sensor selection.

Thus, the selection criteria 114 may define a manner and extent to which various types of the context information may be used in making the sensor selection. For example, the selection criteria 114 may define certain types and/or values of context information which, if present, may be used to dictate a manner in which the sensor selection will occur. Various specific examples of these and other formulations of the selection criteria 114 are provided in detail below, or would be apparent to one of skill in the art.

Thus, during operation, the sensor controller 102 may utilize a sensor selector 116 which may be configured to receive current context information from the context monitor 112, and may be configured to determine relevant selection criteria from the selection criteria 114, to thereby select one or more sensors from among available sensors 106A, 106B, 106C. As described above, although the sensor selector 116 may utilize historical context information with respect to execution of the selection criteria 114, it may be appreciated that the sensor selector 116 may enable dynamic, real time selection between and among the available sensors 106A, 106B, 106C.

As a result, it may occur that the user 108 may be provided with an enhanced user experience of the system 100, without requiring significant, if any, additional effort or expertise on the part of the user 108. For example, the user 108 may execute the application 104A to achieve a desired result which may be based in part on an associated sensor functionality. During such operation of the application 104A, the sensor controller 102 may operate as described herein to select the sensor 106A for use by the application 104A.

As described, the user 108 need not be involved in the selection process. To the contrary, the selection process may occur in real time as the user 108 executes the application 104A, so that the user 108 simply receives the desired result, without necessarily having an awareness of how the necessary sensor functionality and/or sensor data was obtained. Nonetheless, as referenced, by virtue of the operations of the sensor controller 102, the user 108 may be provided with various advantages, such as, e.g., increased speed in receiving a desired result, reduced power consumption, and/or improved energy conservation.

Moreover, such advantages may be provided to the user 108 at a minimal or negligible cost or inconvenience to the user 108. For example, in the location-based exampled provided above, as referenced, the user 108, during a particular execution of the application 104A, may have a relatively reduced need for accuracy in determining a desired location (e.g., may only require an approximation of a location). Such reduced need for accuracy may be determined by the sensor selector 116 based on the selection criteria 114 and context information obtained from the context monitor 112. In such scenarios, the sensor selector 116 may select a sensor which meets the necessary standard for accuracy in determining location and which consumes a relatively smaller amount of power than a separate, more accurate sensor.

As referenced above, the system 100 may be executed using various types and amounts of computing resources. In the example of FIG. 1, a conceptual example of an execution of the system 100 is illustrated in which at least one computing device 118 is shown as including at least one processor 118A together with a computer readable storage medium 118B. Thus, the system 100 of FIG. 1 should be understood to include one, two, or more individual computing devices, where each such computing device may include one, two, or more available processors, as well as associated computer memory which may be available in a quantity and to an extent necessary or desired for a particular implementation of the system 100.

In this regard, it may be appreciated that the example of FIG. 1 provides a specific, non-limiting example of possible structures and architectures that may be utilized to obtain the functionalities and advantages described herein. For example, components of FIG. 1 are generally illustrated as individual, separate components in communication with one another. However, it may be appreciated that some or all of two or more such components may be combined with another component, or combined into a single component, while, conversely, a component illustrated as a single element within FIG. 1 may alternatively be executed as two or more separate components. For example, portions of the input handler 110, as referenced above, may be implemented as an API of the application(s) 104A, 104B.

Portions of the system 100 may be executed on a local computing device, while other portions are executed on a remote computing device, e.g., on a computing device which is accessed by the user 108 over a computer network, such as, e.g., the public internet or a corporate intranet. In other examples, the system 100 may be executed using a single device which is local to the user 108, e.g., a mobile computing device such as a smartphone, tablet computer, or laptop or desktop computer.

Thus, FIG. 1 illustrates specific examples in which the user 108 may be provided with personalized, transparent, dynamic, and/or real time sensor selection for optimized execution of one or more applications 104A, 104B. Many other examples of various implementations which provide these and other features and advantages are provided in detail below.

Figure 2:
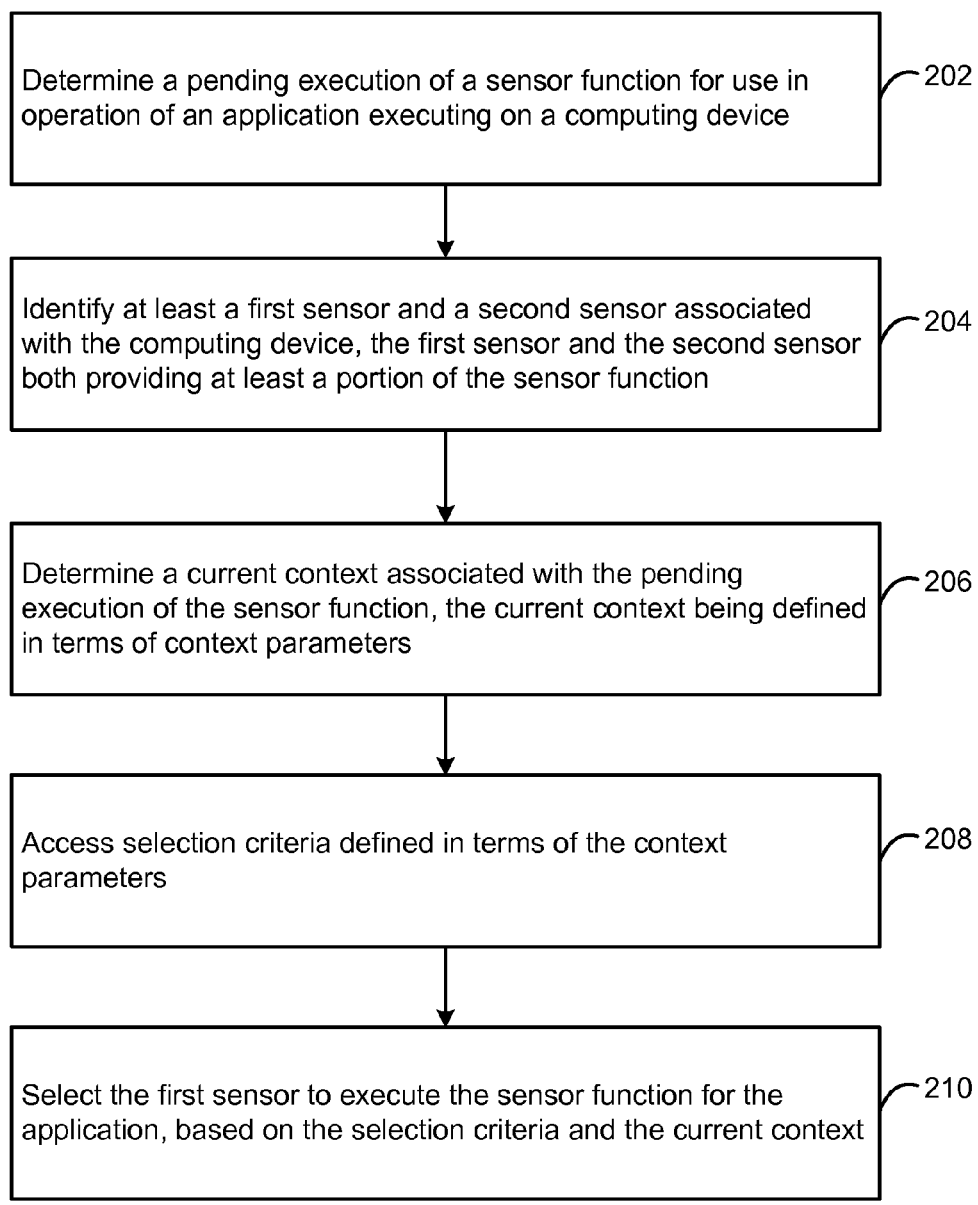
FIG. 2 is a flowchart illustrating example operations of the system of FIG. 1.

FIG. 2 is a flowchart 200 illustrating example operations of the system 100 of FIG. 1. In the example of FIG. 2, operations 202-210 are illustrated as distinct, sequential operations that may be executed by the system 100 of FIG. 1. However, it may be appreciated that FIG. 2 is merely an example of various operations of the system 100, and that many other additional or alternative embodiments may be implemented. For example, additional or alternative operations may be used in conjunction with the operations 202-210, and/or one or more of the operations 202-210 may be omitted. Further, any two or more of the operations 202-210 may be executed in a partially overlapping or parallel fashion. In other examples, the operations 202-210 may be executed in an order different than that shown, unless specifically required to operate in the order illustrated.

In the example of FIG. 2, a pending execution of a sensor function for use in operation of an application executing on a computing device may be determined (202). For example, the input handler 110 of the sensor controller 102 may receive, monitor, or otherwise determine that the application 104A executing on the computing device 118 requires immediate or future use of a particular sensor function. In this sense, the sensor function may be currently executing with a particular sensor, yet continuing/future executions of the sensor functions, perhaps with a different sensor, may be considered to be pending.

In specific examples, the input handler 110 may receive a direct request for a sensor or type of sensor, or may receive a request for data which may only be provided by a specific set of sensors or type of sensor. In other examples, however, as described in detail herein, the input handler 110 may receive a request for data that may be useful in determining a desired result. In such cases, it may be possible to use more than one type of sensor to determine the desired result. In other words, it may be possible to deduce a given outcome from more than one type of sensor data.

For example, the application 104A may seek to determine whether a food product has expired. In such examples, it may be possible to determine spoilage or other expiration of the food product based on more than one type of sensor reading. For example, if spoilage is associated with excessively high temperature, than, in a simple example, spoilage may be determined by an actual temperature measurement from a temperature sensor. Similarly, however, it may occur that certain locations are associated with excessively high temperatures, so that a location sensor also may be serviceable in determining whether excessive temperature (and thus, spoilage) is a factor.

At least a first sensor and a second sensor associated with the computing device may be identified, where the first sensor and the second sensor are both available to provide at least a portion of the sensor function (204). For example, the input handler 110 may determine at least the first sensor 106A and the second sensor 106B as being associated with the computing device 118, and as being available to provide some or all of the sensor functions desired by the application 104A.

For example, as referenced above, such determination(s) may be fairly straight-forward, such as when the application 104A specifically identifies or otherwise requests the sensors 106A, 106B, or, similarly, when the user 108 specifically identifies one or both of the sensors 106A, 106B. In other examples, however, the input handler 110 may be configured to directly determine the sensors 106A, 106B, as being available for provision of some or all of the sensor functions.

For example, the input handler 110 may directly determine, or may indirectly determine based on information from the context monitor 112, that the sensors 106A, 106B are currently executing or available to execute in conjunction with the computing device 118. As just referenced, such determinations may be as straightforward as associating a request for a temperature measurement with one or more temperature sensors. In other examples, however, the input handler 110 may be configured to execute a more elaborate decision making process regarding determination of the sensors 106A, 106B.

For example, as referenced above, the input handler 110 may be configured to abstract the nature of the sensor data required by the application 104A, so as to determine one or more different types of sensors which may ultimately provide the desired results, such as in the example above in which the input handler 110 may determine the possibility of utilizing location sensors to indirectly determine the presence of excessive temperatures (and associated results, e.g., food spoilage).

In some cases, it may occur that a combination of two or more sensors may be necessary or available to provide the sensor function. For example, it may occur that the sensor 106C is a temperature sensor which may provide a direct temperature measurement, while the sensors 106A, 106B may provide desired information in conjunction with one another. In an example of the latter, it may occur that the sensor 106A is a location sensor, while the sensor 106B is a radio frequency ID (RFID) sensor which may detect information about an RFID tag associated with an item in question. In such cases, it may occur that the sensor function required by the application 104A may be provided either by the sensor 106C by itself, or by a combination of the sensors 106A, 106B, to achieve the desired result of detecting potential food spoilage.

A current context associated with the pending execution of the sensor function, the current context being defined in terms of context parameters, may be determined (206). For example, the context monitor 112 may be configured to monitor or otherwise determine context parameters associated with one or more of the user 108, the applications 104A, 104B, the sensors 106A-106C, the computing device 118, and any subcomponents thereof, and/or virtually any past, present, or projected information about an environment or context of the system 100 (e.g., network conditions associated with a network of the computing device 118), or any other contextual information which may be useful in selecting between available sensors 106A-106C for execution therewith of the sensor function desired by the application 104A. That is, such the context may be considered to be current inasmuch as it exists at the point in time, although, as just described, the current context may include past (i.e., collected), present, or potential context data. Further, the context parameters may be predefined as having a certain type, nomenclature, semantics, or any other characteristics necessary to express the context parameters in a manner which is consistent with comparison against the selection criteria 114, as described in detail herein.

Thus, such selection criteria defined in terms of the context parameters may be accessed (208). For example, the sensor selector 116 may be configured to access the selection criteria 114. As just referenced, and as described in detail herein, the selection criteria 114 may be defined in terms of possible values and ranges of context parameters, and based on possible relationships between the context parameters, so as to thereby enable a desired selection between the available sensors and subsequent achievement of a desired outcome. For example, in some implementations, the user 108 may desire to maximize an efficiency of available power (e.g., battery life) associated with the at least one computing device 118. In other examples, however, the user 108 may wish to achieve results in the shortest amount of time. In these and other scenarios, it may be appreciated that the selection criteria 114 may be defined so as to achieve a particular outcome desired by the user 108, or otherwise associated with the application 104A.

Consequently, the first sensor may be selected to execute the sensor function for the application based on the selection criteria and the context (210). For example, the sensor selector 116 may be configured to receive the current context from the context monitor 112, and may be configured to access the selection criteria 114, as well.

As referenced above, the sensor selector 116, perhaps in conjunction with the input handler 110, may be configured to abstract a nature of the sensor function desired by the application 104A and/or may be configured to characterize or abstract a result desired by the application 104A. In these and other scenarios, the sensor selector 116 may thus be configured to execute the selection criteria 114 based on the current context from the context monitor 112, so as to thereby select, e.g., the sensor 106A for use in executing at least a portion of the sensor function desired by the application 104A. That is, as referenced above, the selected sensor 106A may perform all of the desired sensor functions, or may perform the desired sensor function in conjunction with another sensor that may be selected by the sensor selector 116 (e.g., the sensor 106C).

Figure 3:
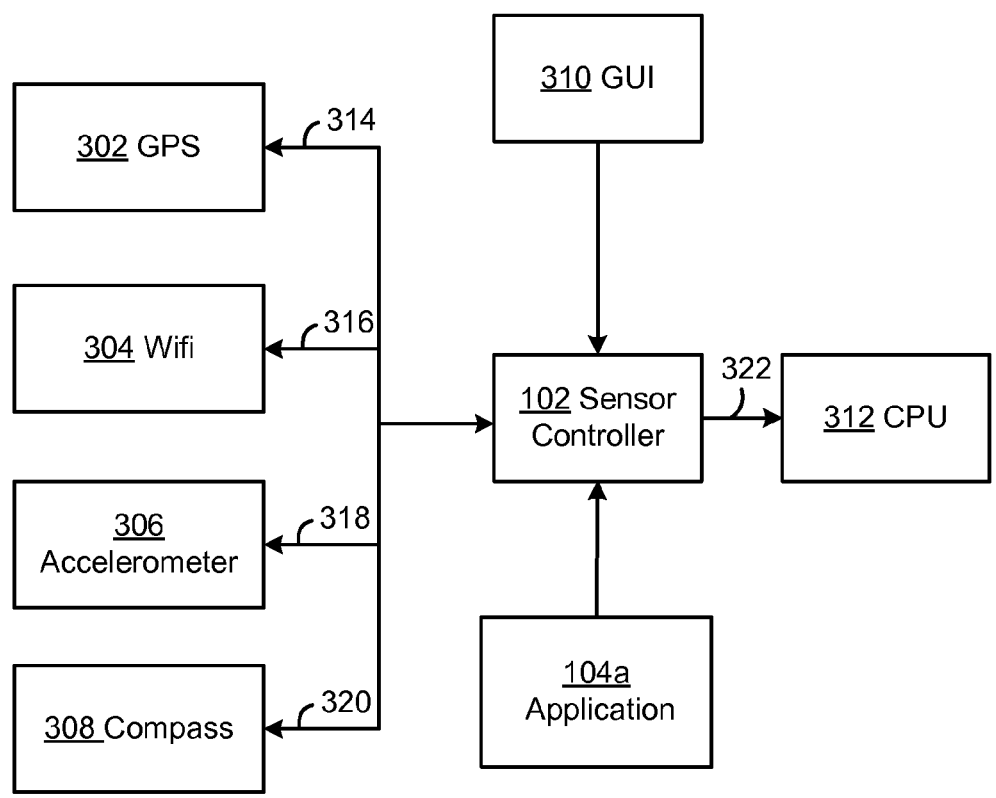
FIG. 3 is a block diagram of a system illustrating more detailed examples of operations of the system of FIG. 1.
Figure 4:
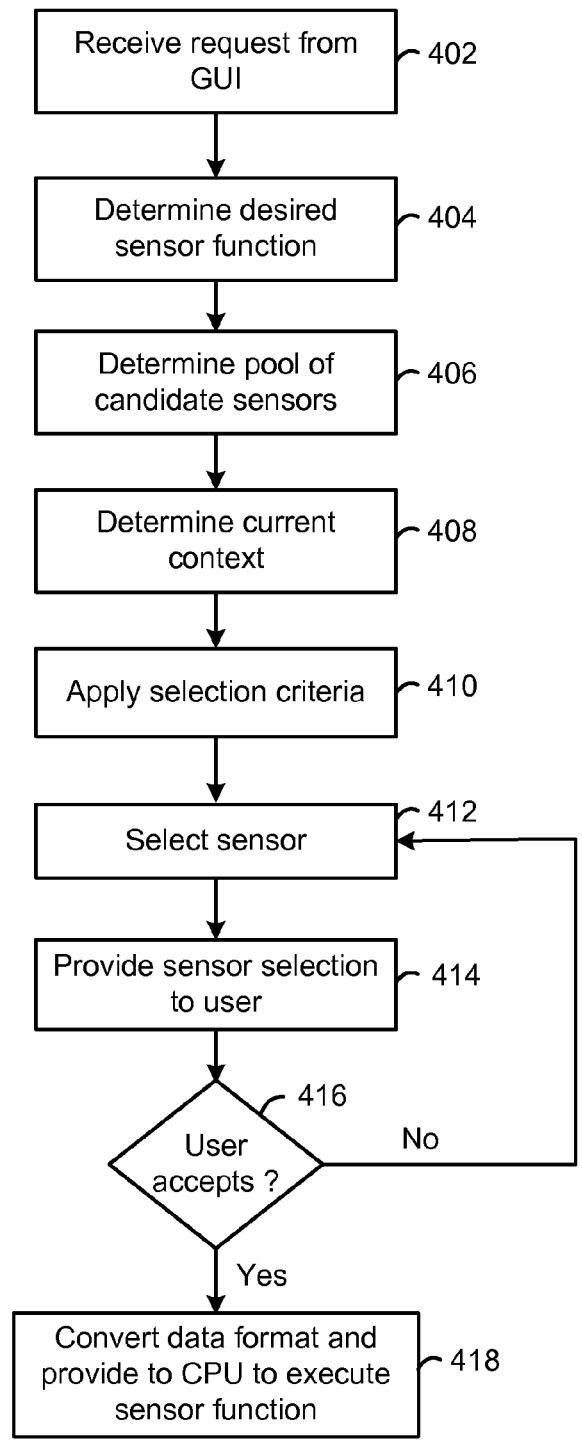
FIG. 4 is a flowchart illustrating example operations of the systems of FIGS. 1 and 3.

FIGS. 3 and 4 provide more detailed examples of operations of the system 100, e.g., example implementations in which the sensor function is related to determining relevant location information. However, it may be appreciated from the above discussion of FIGS. 1 and 2 that the system 100 is generally operable to provide dynamic, real time, intelligent selection between a plurality of available sensors 106A-106C during execution of one or more applications 104A, 104B. In this way, available sensor resources of the system 100 may be maximized, and/or may be flexible and configurable with respect to a desired operation or outcome desired by the user 108.

FIG. 3 is a block diagram of a system 300 illustrating a specific implementation of the system 100 of FIG. 1. In the example of FIG. 3, as shown, sensors 302, 304, 306, and 308 may be considered to be location or location-related sensors. Specifically, as shown, the sensor 302 may include a GPS sensor (i.e., a GPS receiver), the sensor 304 may include a Wi-Fi based location sensor, the sensor 306 may include an accelerometer, and the sensor 308 may include a compass.

By themselves, each of these sensors 302-308 are conventional and well known, and are therefore not described herein in detail, except as may be necessary or helpful in understanding the operation of the system 300. In general, for example, it may be observed with respect to FIG. 3 that each of the sensors 302-308 is specifically or generally related to providing location or location-related information. In so doing, each of the sensors 302-308 may generally be associated with particular features and associated advantages/disadvantages and benefits/costs.

For example, the GPS sensor 302 may provide a highest level of accuracy with respect to location information and relative to remaining sensors 304-308. Meanwhile, the Wi-Fi based location sensor 304 may provide a lower degree of accuracy than the GPS sensor 302, yet may require lesser amounts of power in order to do so. Meanwhile, sensors 306, 308 may provide general directional information, while requiring a minimal amount of power to do so.

As shown in the example of FIG. 3, each of the sensors 302-308 may be connected, or in communication with, the sensor controller 102. Meanwhile, a graphical user interface (GUI) 310 may be provided, for use by the user of the system 300. For example, the GUI 310 may be used to configure the sensor controller 102, e.g., by allowing the user to define the selection criteria 114, the context parameters to be collected by the context monitor 112, and other operational aspects of the sensor controller 102, as described herein.

In further examples, the GUI 310 may be associated with management of the sensor controller 102 during an operation of the system 300. For example, the sensor controller 102, e.g., the sensor selector 116, may, as referenced above, provide the user with an opportunity to proactively select from among the sensors 302-308, or a subset thereof (as determined by the sensor controller 102). In these and other examples, it may be appreciated that the GUI 310 may be associated with one or more of the applications 104A, 104B which seek to benefit from operations of the sensors 302-308, or, in other implementations, the GUI 310 may be presented as a stand alone feature provided to a user of the system 300.

Further in the example of FIG. 3, a CPU 312 is illustrated, and may be understood to correspond conceptually to the at least one processor 118A of the system 100 of FIG. 1. That is, it may be appreciated that a computing device executing the system 300 may include the CPU 312, which may be configured to control one or more of the sensors 302-308, and to receive and manipulate sensor data received therefrom.

Thus, in the example of FIG. 3, the sensor controller 102 may be understood to execute, as illustrated, as middleware operating between the sensors 302-308 and the CPU 312. Consequently, as described herein, the sensor controller 102 may be understood to be positioned and operational to select between and among the sensors 302-308, for use by the CPU 312. That is, it may be appreciated that the CPU 312 may also be operational to execute the applications 104A, 104B, or similar applications, and to, in so doing, rely on the sensor functionality of, and sensor data collected from, one or more of the sensors 302-308 as selected and executed by the sensor controller 102.

In addition to providing the sensor selection functionality as described herein, the sensor controller 102 may be further configured to provide a translation, abstraction, or other processing of sensor data received from the sensors 302-308 for provision thereof to the CPU 312. For example, as shown in FIG. 3, the sensors 302, 304, 306, 308 may be connected to the sensor controller 102 via respective connections 314, 316, 318, 320.

For example, one or more of the connections 314-320 may represent an external connection between a given sensor and a computing device executing the sensor controller 102. That is, although the sensors 106A-106C are illustrated in the example of FIG. 1 as being contained within the at least one computing device 118, in practice the one or more of the sensors 302-308 may be connected externally, e.g., by way of a universal serial bus (USB) connection.

More generally, the sensors 302-308 may be connected by virtually any wired or wireless connection, e.g., Ethernet, Wi-Fi, Bluetooth, Infrared, or virtually any other available hardware/software connection. Such connections, by themselves, are generally well known, and also are known to be associated with particular, corresponding data formats, communications, protocols, syntax, semantics, and other communication parameters. Thus, in the example of FIG. 3, sensor controller 102 is illustrated as being configured to translate, abstract, or otherwise transform each or all of the data formats and other communication parameters associated with the connections 314-320, to thereby utilize a single data format, communications protocol, syntax, semantics, and other communication parameters, for communication therewith the CPU 312.

In this way, it may be appreciated that a given application utilizing one or more of the sensors 302-308, e.g., the application 104A, as shown, may benefit from interfacing only with, or based on, the communications link 322, rather than on the various other communication links 314-320. For example, the input handler 110 and/or the sensor selector 116 may be implemented as, or in conjunction with a particular application program interface (API) associated with the application 104A. Thus, it may be appreciated that in order to develop the application 104A for execution thereof in conjunction with utilization of the sensor functionality of the sensors 302-308, an application developer may be facilitated in achieving a desired sensor functionality, with a minimal level of effort/knowledge, and in an efficient and productive manner.

Thus, in the example of FIG. 3, during an initial use of the system 300, it may occur that the sensor controller 102 has been provided by a manufacturer with default settings which define the type and manner of context parameters to be collected, as well as default selection criteria to be used in conjunction with such context parameters to make a selection between the sensors 302-308. At such time, of course, a user of the system 300 may use the GUI 310 or other appropriate techniques to modify such default settings. For example, the user may change a type or number of context parameters to be collected, or may modify the selection criteria governing a use of such context parameters in selecting between the sensors 302-308.

As referenced above, context parameters collected by the context monitor 110 of the sensor controller 102 may include parameters characterizing a historical, existing, or potential context associated with the system 300. For example, such context parameters may be related to usage patterns of one or more users of the system 300, with respect to specific applications and/or with respect to an underlying hardware and/or software platform. For example, such usage patterns may indicate whether the user preferred a particular sensor during a previous use of the application(s) in question, or whether the user is known to re-charge the at least one computing device 118 regularly (or, similarly, to predict whether the user is likely to re-charge the at least one computing device 118 in the near future).

In these and other examples, the context parameters also may be related to a current context associated with the system 300. For example, the context parameters may characterize a current location of the user and/or the system 300, whether the user or the system is currently stationary or in motion, whether and which additional applications are currently being executed in conjunction with operation of the system 300, a current power source of the system 300 (e.g., battery or outlet), or any other presently existing information which may be useful or required with respect to the selection criteria.

Thus, in practice, a user of the system 300 may execute one or more applications which may require or benefit from location information provided by one or more of the location-related sensors 302-308. While utilizing such applications, the user may be dynamically provided with one or more of the sensors 302-308 which have been selected for providing the desired sensor function at that particular point in time.

For example, the user may utilize an application designed to provide information about a particular business or other address. In such cases, it may occur that the user is initially distant from the specified address, so that a desired level of accuracy with respect thereto may be relatively low. In such cases, the sensor controller 102 may select a combination of the accelerometer 306 and the compass 308 to direct the user in a general direction of the desired location.

As the user travels closer to the desired location, the sensor controller 102 may determine that a greater level of accuracy is needed, and may therefore convert to usage of the Wi-Fi location sensor 304. Similarly, during a final approach of the user to the specified address, the sensor controller 102 may dynamically switch to utilization of the GPS sensor 302, in order to provide the user with a highest available degree of accuracy in locating the desired address.

As may be appreciated from the above discussion, in such scenarios, the power used in locating the address in question is thus reduced from an alternate scenario in which the GPS sensor 302 is used during the entirety of the navigation. That is, the systems 100/300 of FIGS. 1 and 3 may be configured to activate a desired sensor while deactivating a sensor that is not, or will not be, used, so that the non-used sensor does not needlessly utilize battery power, available memory, or other available computing resources.

In many scenarios, energy conservation and/or power saving may be of paramount importance to a user of the system 300, so that the selection criteria 114 and the sensor selector 116 may be configured so as to provide a minimum level of the desired functionality, so as to thereby conserve a maximum amount of power. Conversely, however, it may occur in other situations that the user is not as concerned with power saving, and prefers instead to have the fastest and most accurate location information that is currently available. In such scenarios, the selection criteria 114 and the sensor selector 116 may be configured accordingly, so that, in the example, the user would be provided with location information by way of the GPS sensor 302 during an entirety of the navigation.

In the example of FIG. 3, many variations of the examples just given may be implemented. Moreover, the system 300 has the flexibility to provide these variations, at different points in time, and according to different preferences of the one or more users of the system 300.

FIG. 4 is a flowchart illustrating more detailed example operations of the system 100 of FIG. 1, in conjunction with the example of the system 300 of FIG. 3. In the example of FIG. 4, a request may be received from an associated GUI (402). For example, as referenced above with respect to FIG. 3, the GUI 310 may be a stand alone application related to the sensor controller 302, or may be representative of a user interface associated with one or more of the applications (e.g., applications 104A, 104B) which may be desirous of sensor functionality associated with one or more of the sensors 302-308. As may be appreciated from the above description, the request may be explicitly formed by the user of the system 300, or may be implicit in a request or other action of the user with respect to the application in question.

Based on the request, a desired sensor function may be determined (404). For example, as referenced above, the input handler 110 may receive the request from the GUI 310, and may determine specific sensor functionality that may be useful or necessary in providing a desired response to the received request. As referenced, in many cases, such determinations may be a straightforward determination of a specific type of sensor associated with the specific sensor function. In other cases, however, it may occur that the sensor function which enables providing of the desired response to the application related request may be obtained or provided by different types or combinations of available sensors. In such cases, as referenced, determination of the desired sensor function may include an abstraction of the desired sensor function relative to the desired result/response, so as to better determine all types of available sensors which may be instrumental in providing the desired outcome.

Accordingly, a pool of candidate sensors may be determined (406). For example, the sensor selector 116 may be configured to select, perhaps in conjunction with the input handler 110, all of the available sensors which might be utilized to perform the specific sensor function. In some cases, the determination of such a pool of candidate sensors may include simply detecting sensors which are incorporated within a computing device, (e.g., the computing device 118). In other cases, the determination may include detecting devices which are externally connected to the relevant computing device. In still other examples, it may occur that the pool of candidate sensors includes sensors which are remote from a computing device executing the sensor controller 102 (e.g., are connected over a local or wide area computer network).

Subsequently, a current context may be determined (408), e.g., by the context monitor 112. As referenced, current context in such scenarios may include current values of historical or previously collected context parameters, e.g., historical usage patterns of the user in question, previous locations of the user when requesting the sensor functionality, power usage associated with the computing device, and other stored context parameters.

At the same time, such context parameters may include dynamically determined values for currently existing context parameters. In this regard, it may be appreciated that some or all of the sensors which are in the pool of candidate sensors may be utilized by the context monitor 112 in order to collect and determine present context information. In additional or alternative examples, however, other sensors, outside of the pool of candidate sensors and not related to the requested sensor functionality, may be used to determine context. For example, keyboard tracking software exists which may be used by or within the context monitor 112 to track information entered into the computing device 118 by a user thereof, for use in establishing various context parameters.

In some scenarios, the context monitor 112 may continuously collect some or all of the specified context parameters within a predefined universe of possible context parameters that may be collected. In other examples, the context monitor 112 may only periodically collect such context parameters, or subsets thereof, e.g., in a batch collection process. In additional or alternative examples, the context monitor 112 may collect the context parameters in a more focused and/or proactive manner. For example, the context monitor 112 may determine from the requested sensor functionality and associated pool of candidate sensors a subset of the universe of available context parameters for collection at that point in time, based on a determination that such context parameters will be most likely to be useful in executing the selection criteria and ultimately selecting a sensor from the pool of available candidate sensors.

Consequently, selection criteria may be applied (410), e.g., by the sensor selector 116, so as to determine, based on the context parameters, which of the sensors from the pool of available candidate sensors should be selected. As a result, one or more of such sensors may be selected (412) by the sensor selector 116.

Accordingly, in example, optional implementations, the one or more selected sensors may be provided as options to the user (414). For example, the GUI 310 may be used to provide the user with information about the selected sensor, and to provide the user with an option to select the selected sensor for proceeding, or to reject the selected sensor. If the user accepts (416), then the sensor controller 102 may proceed with converting the data format of the sensor data provided by the selected sensor for provision thereof to the GPU 310, in related operations for executing the desired sensor function (418). If the user does not accept (416), then the sensor controller 102 may select a secondary sensor (412) for provision thereof to the user (414), until if and when the user accepts the selected sensor for proceeding (416).

In additional or alternative example implementations, as referenced above, the selection criteria 114 may specify that a speed of obtained results is of significant or exclusive importance in selecting between two or more sensors. For example, a user may wish to know location information as quickly as possible, and so the sensor selector 116 may select the fastest available sensor, or, if power consumption is of lesser or no importance, may enable all available/suitable location sensors and then utilize the first-returned location information.

In other examples, as referenced above, reliability of a given sensor(s) in providing a desired sensor function may play a role in the selection criteria 114, and thus in the operations of the context monitor 112 and the sensor selector 116. For example, the context monitor 112 may determine that although one or both of GPS and/or WiFi coverage is available, a quality of service (QOS) of one or both may be inadequate for a desired use of an associated application (e.g., the application 104a). For example, the context monitor 112 may predict or detect a reduction or loss of coverage quality (e.g., upon prediction or detection of entry of a building, or a tunnel), or inoperability of a sensor (e.g., of a compass in the presence of a magnetic field). Such reliability considerations may thus prompt at least temporary selection of a given sensor relative to the sensor associated with quality of service concerns.

In other, related examples, if the context monitor 112 determines that the user is inside a building, the sensor selector 116 may decide not to use GPS to determine location, in favor of a wifi signal and the user's movement determined via a gyroscope and/or accelerometer. Further, if GPS is used to find a coffee shop or other location, and the sensor controller 102 tracks available wireless networks, the sensor controller 102 may later determine that the user was exactly at the coffee shop by matching the wireless networks to a known list, without turning on the GPS a second time (thereby saving power).

Thus, the user may be provided with sensors to thereby obtain desired sensor functionality and associated outcomes, in a manner which matches the preferences of the user, and which optimizes and otherwise enhances the user's experience. Many other additional and alternative variations are contemplated. For example, contrary to the specific example flowchart of FIG. 4, it may occur that the sensor controller 102 automatically selects a desired sensor, without requiring acceptance thereof by the user. In such cases, the user may be provided with desired sensor functionality, while requiring a minimum of knowledge and involvement in the selection thereof by the user. Similarly, many other variations would be apparent to one of skill in the art.

Figure 5:
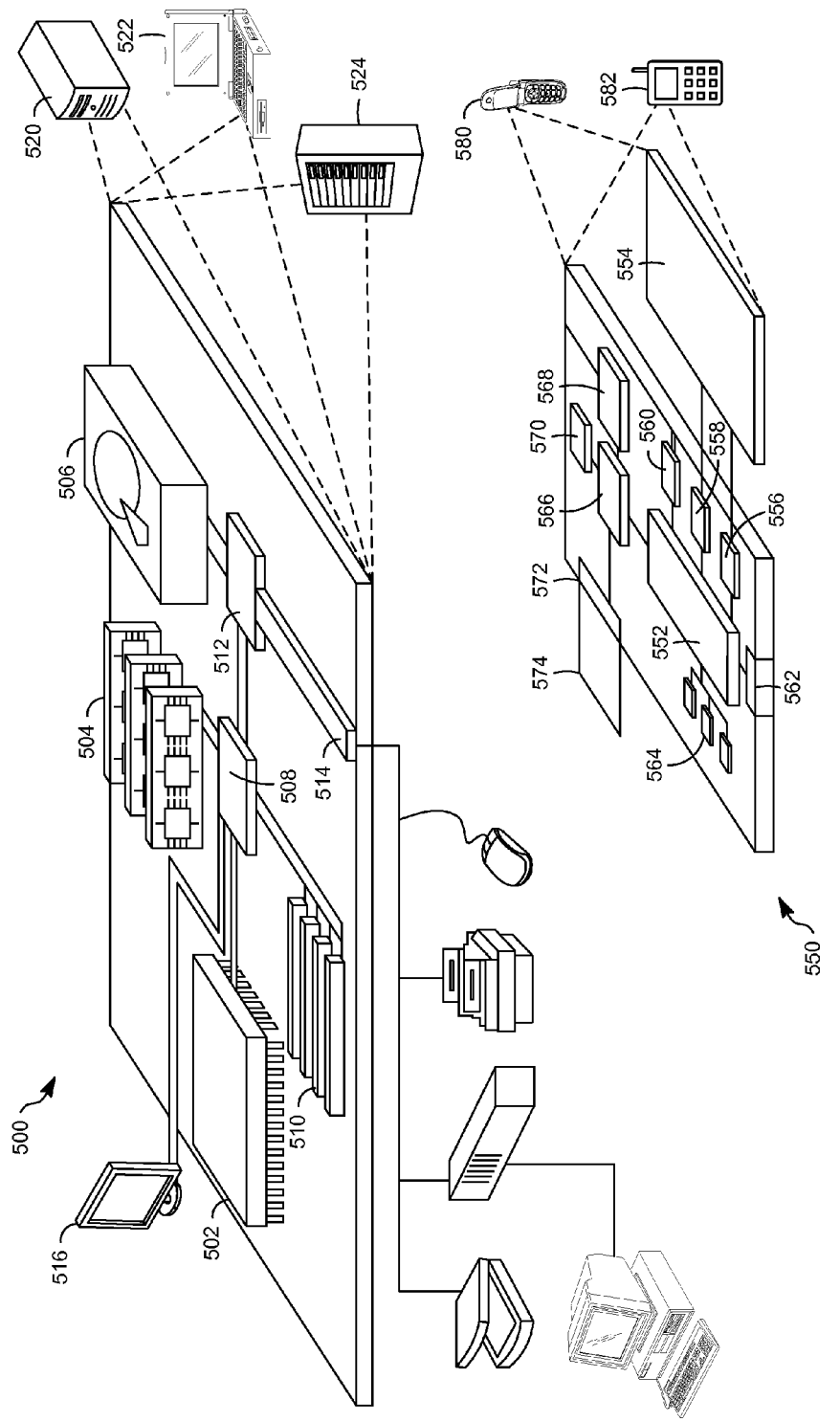
FIG. 5 is a block diagram showing example or representative computing devices and associated elements that may be used to implement the systems and methods of FIGS. 1-4.

FIG. 5 is a block diagram showing example or representative computing devices and associated elements that may be used to implement the systems of FIGS. 1 and 3. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A mobile computing device comprising:
a software application;
a plurality of sensors configured to communicate with a sensor controller using corresponding sensor data formats, the plurality of sensors including a first sensor and a second sensor, the first sensor having a higher level of accuracy than the second sensor;
the sensor controller configured to obtain; when the first sensor is used, location data having a first sensor data format from the first sensor via a first communication link, the sensor controller configured to obtain, when the second sensor is used, location data having a second sensor format from the second sensor via a second communication link, the location data having the first sensor data format representing a location with a level of accuracy higher than the location data having the second sensor data format, at least a portion of the sensor controller being implemented as at least one application programming interface (API) associated with the software application,
wherein the sensor controller is configured to determine, during an execution of the software application, a sensor function required by the software application,
wherein the sensor controller is configured to receive context information and determine selection criteria information, the selection criteria information including decision-making criteria for selecting between the plurality of sensors,
wherein the sensor controller is configured to select for use at least one of the first sensor and the second sensor among the plurality of sensors based on the context information and the selection criteria information, the selection criteria information including historical usage patterns of a user of the software application, the sensor controller configured to make a prediction regarding future sensor usage, based on the historical usage patterns, and to select at least one of the first sensor and the second sensor, based on the prediction, the historical usage patterns including whether the user preferred a particular sensor during a previous use of the software application, wherein, when the first sensor is selected, the sensor controller is configured to convert the location data having the first sensor data format to a common data format, wherein, when the second sensor is selected, the sensor controller is configured to convert the location data having the second sensor data format to the common data format, wherein the sensor controller is configured to communicate the location data having the common data format to at least one processor for executing the software application with the location data via a third communication link, the common data format being a communication protocol that is used for communication between the sensor controller and the at least one processor that is different than the first data format or the second data format.

2. The mobile computing device of claim 1, wherein the sensor controller is further configured to:
determine a pending requirement for the sensor function for use in the execution of the software application;
identify a subset of the plurality of sensors configured to provide at least a portion of the sensor function; and
select at least one of the first sensor and the second sensor from the subset.

3. The mobile computing device of claim 1, wherein the context information includes performance characteristics of the plurality of sensors relative to one another.

4. The mobile computing device of claim 1, wherein the sensor controller is configured to provide configuration options for defining context parameters of the context information.

5. The mobile computing device of claim 1, wherein the sensor controller is configured to provide configuration options for defining the selection criteria information.

6. The mobile computing device of claim 1, wherein the sensor controller is configured, upon the selection of at least one of the first sensor and the second sensor, to deactivate a previously-selected sensor, and to activate the selected sensor.

7. The mobile computing device of claim 1, wherein the sensor controller is configured to select the first sensor at a first time, and the sensor controller is configured to:
reevaluate the selection of the first sensor at a second time during the execution of the software application;
select the second sensor from the plurality of sensors at the second time, based on the context information and the selection criteria information;
deactivate the first sensor with respect to the software application, and
activate the second sensor to continue providing the same sensor function to the software application.

8. The mobile computing device of claim 1, wherein the plurality of sensors include a Global Positioning System (GPS) sensor, a Wi-Fi-based location sensor, an accelerometer, and a compass.

9. The mobile computing device of claim 1, wherein the context information includes a level of current battery resources, a current location of the mobile computing device, a level of accuracy required by the software application, levels of accuracy provided by the first sensor and the second sensor, and network conditions associated with a network of the software application.

10. A computer program product including instructions stored on a non-transitory computer-readable storage medium being executed by a sensor controller of a mobile computing device, the sensor controller including at least one application programming interface (API) associated with a software application, the software application being executed by at least one processor on the mobile computing device, the sensor controller configured to:
communicate with a plurality of sensors using corresponding sensor data formats, the plurality of sensors including a first sensor and a second sensor, the first sensor having a higher level of accuracy than the second sensor;
determine, during an execution of the software application, a sensor function required by the software application;
determine a level of accuracy required by the software application;
collect context information including context parameters;
select for use at least one of the first sensor and the second sensor among the plurality of sensors based on the context parameters and selection criteria information, the selection criteria information including historical usage patterns of a user of the software application to make a prediction regarding future sensor usage, wherein at least one of the first sensor and the second sensor is selected based on the prediction, the historical usage patterns including whether the user preferred a particular sensor during a previous use of the software application;
receive, when the first sensor is used, location data having a first sensor data format from the first sensor via first communication link;
receive, when the second sensor is used, location data having a second sensor data format from the second sensor via a second communication link, the location data having the first sensor data format representing a location with a level of accuracy higher than the location data having the second sensor data format;
translate, when the first sensor is used, the location data having the first sensor data format to a common data format;
translate, when the second sensor is used, the location data having the second sensor data format to the common data format; and
communicate the location data having the common data format to the at least one processor for executing the software application via a third communication link, the common data format being a communication protocol that is used for communication between the sensor controller and the at least one processor that is different than the first data format or the second data format.

11. The computer program product of claim 10, wherein the historical usage patterns includes whether the user is known to re-charge the mobile computing device associated with the plurality of sensors.

12. The computer program product of claim 10, wherein the context parameters include information on whether the mobile computing device is stationary or in motion.

13. The computer program product of claim 10, wherein the sensor controller is configured to select both the first sensor and the second sensor and utilize first-returned location information from either the first sensor or the second sensor.

14. The computer program product of claim 10, wherein the first sensor is a Global Positioning System (GPS) sensor, and the second sensor is a Wi-Fi-based location sensor.

15. The computer program product of claim 10, wherein the first sensor is selected at a first time, and the sensor controller is configured to:
- reevaluate the selection of the first sensor at a second time during the execution of the software application;
- collect secondary context information;
- select the second sensor from the plurality of sensors at the second time based on the secondary context information and the selection criteria information;
- deactivate the first sensor with respect to the software application, and
- activate the second sensor to continue obtaining location data for execution within the software application.

16. A method executed by a sensor controller of a mobile computing device, the sensor controller including at least one application programming interface (API) associated with a software application, the software application being executed by at least one processor on the mobile computing device, the method comprising:
- communicating with a plurality of sensors using corresponding sensor data formats, the plurality of sensors including a first sensor and a second sensor, the first sensor having a higher level of accuracy than the second sensor;
- determining, during an execution of the software application, a sensor function required by the software application;
- selecting for use at least one of the first sensor and the second sensor based on context parameters and selection criteria information, the selection criteria information including historical usage patterns of a user of the software application to make a prediction regarding future sensor usage, wherein at least one of the first sensor and the second sensor is selected based on the prediction, the historical usage patterns including whether the user preferred a particular sensor during a previous use of the software application;
- receiving, when the first sensor is used, location data having a first sensor data format from the first sensor via a first communication link;
- receiving, when the second sensor is used, location data having a second sensor data format from the second sensor via a second communication link, the location data having the first sensor data format representing a location with a level of accuracy higher than the location data having the second sensor data format;
- translating, when the first sensor is used, the location data having the first sensor data format to a common data format;
- translating, when the second sensor is used, the location data having the second sensor data format to the common data format; and
- communicating the location data having the common data format to the at least one processor for executing the software application via a third communication link, the common data format being a communication protocol that is used for communication between the sensor controller and the at least one processor that is different than the first data format or the second data format.

17. The method of claim 16, further comprising:
- providing, via a user interface, default settings which define the context parameters and the selection criteria information, the selection criteria information defining a manner in which the context parameters are used in sensor selection;
- receiving, via the user interface, a change to a first default setting to modify the context parameters and a change to a second default setting to modify the selection criteria information, wherein the change to the first default setting includes a change to a number of context parameters used in the sensor selection.

18. The method of claim 17, wherein the change to the second default setting includes changing the selection criteria from selecting the sensor based on accuracy to selecting the sensor based on power consumption.

* * * * *